(12) United States Patent
Ginsberg

(10) Patent No.: US 6,574,747 B2
(45) Date of Patent: Jun. 3, 2003

(54) EXTENSIBLE EXECUTE IN PLACE (XIP) ARCHITECTURE AND RELATED METHODS

(75) Inventor: Michael Ginsberg, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 236 days.

(21) Appl. No.: 09/730,946

(22) Filed: Dec. 5, 2000

(65) Prior Publication Data

US 2002/0069342 A1 Jun. 6, 2002

Related U.S. Application Data

(60) Provisional application No. 60/208,723, filed on Jun. 2, 2000.

(51) Int. Cl.⁷ .............................................. G06F 13/00
(52) U.S. Cl. .......................................... 714/8; 712/248
(58) Field of Search ......................... 712/248; 714/6–8, 714/710, 711

(56) References Cited

U.S. PATENT DOCUMENTS

| | | | | | |
|---|---|---|---|---|---|
| 4,028,679 | A | * | 6/1977 | Divine | 711/115 |
| 5,155,847 | A | * | 10/1992 | Kirouac et al. | 709/221 |
| 5,493,674 | A | * | 2/1996 | Mizutani et al. | 714/6 |
| 6,260,157 | B1 | * | 7/2001 | Schurecht et al. | 714/8 |
| 6,351,822 | B1 | * | 2/2002 | Wright et al. | 714/8 |

* cited by examiner

Primary Examiner—David L. Robertson
(74) Attorney, Agent, or Firm—Lee & Hayes, PLLC

(57) ABSTRACT

A system implementing an execute-in-place (XIP) architecture is presented comprising a plurality of XIP regions. To facilitate execute-in-place functionality across the multiple XIP regions, a virtual address table (VAT) is generated to store pointers to the objects stored in the non-volatile memory hosting the multiple XIP regions.

31 Claims, 4 Drawing Sheets ated with prior art XIP architectures.

EXTENSIBLE EXECUTE IN PLACE (XIP) ARCHITECTURE AND RELATED METHODS

PRIORITY

This application expressly claims priority to Provisional Application No. 60/208,723 filed on Jun. 2, 2000, by Michael Ginsberg.

TECHNICAL FIELD

This invention generally relates to execute in place (XIP) architectures within electronic devices and, more particularly, to an extensible XIP architecture and related methods.

BACKGROUND

The concept of an execute in place (XIP) architecture is not new. Simplistically, an XIP architecture is defined by a system's ability to execute one or more bytes of code while still resident within non-volatile memory (e.g., read-only memory (ROM)), without first transferring the code to volatile memory (e.g., random access memory (RAM)). An XIP architecture is typically comprised of an image having a plurality of modules, stored across one or more non-volatile memory devices. The modules within an image represent applications, dynamic link libraries, data, and the like. In this regard, an image represents a snapshot of a system's operational capability at a point in time. An example of a simple XIP architecture is presented with reference to FIG. 1.

FIG. 1 illustrates a block diagram of computing system 100 utilizing a typical prior art XIP architecture. Computing system 100 is shown comprising a processor 102, coupled to system memory 104 via bus 106. System memory 104 is comprised of volatile memory (e.g., random access memory, or RAM) 108 and non-volatile memory (e.g., read-only memory, or ROM) 110. In addition, computer 100 may include one or more of input device(s) 112, input/output (I/O) interface(s), or ports 114 and a display device 116, each coupled as shown.

As introduced above, computing system 100 includes XIP capability, i.e., the ability to access and/or execute one or more objects (applications, data files, DLL's, etc.) from the non-volatile memory 110. An advantage of XIP architectures such as the one depicted in FIG. 1 is that executing code directly from non-volatile memory 110 reduces the amount of expensive volatile memory 108 required, thereby reducing the overall cost of the system. Moreover, by executing code directly from the non-volatile memory, the perceived execution time of code is faster in a XIP architecture than for a non-XIP architecture. Consequently, XIP architectures are often utilized within personal digital assistants, embedded systems, communications devices (e.g., cellular telephones), information appliances, and other cost sensitive, consumer appliances.

While the cost and performance attributes of the XIP architecture are enticing, the XIP architecture is not without its limitations. One limitation of prior art XIP architectures is that there can be only one (1) XIP region, i.e., region of non-volatile memory that supports XIP. This represents a fundamental limitation of prior art XIP architectures in that the entire XIP image must be replaced to update any of the objects contained therein.

That is, a limitation commonly associated with prior art XIP architectures is the inability to cohesively upgrade individual objects within the XIP architecture without replacing the entire image, or losing the XIP capability. A prior art solution to overcoming this limitation is to embed the new/updated object(s) on an accessible PCMCIA card. This, however, does not preserve the true XIP capability as the objects must be copied from the PCMCIA card to volatile memory 108 for execution.

It will be appreciated by those skilled in the art that replacing the entire image requires replacing of the physical non-volatile memory modules within the device—a task that typically requires the assistance of a skilled technician. Thus, while the initial cost advantages of prior art XIP architectures appear attractive, the inability to selectively modify image components often renders the lifetime cost of such systems prohibitively expensive.

Thus, what is required as an extensible XIP architecture unencumbered by the limitations commonly associated with prior art XIP architectures. Just such a system is presented in the disclosure to follow.

SUMMARY

This invention concerns an extensible execute-in-place (XIP) architecture and related methods for supporting multiple XIP regions. In accordance with a first example embodiment, a system implementing an execute-in-place (XIP) architecture is presented comprising a plurality of XIP regions. To facilitate execute-in-place functionality across the multiple XIP regions, a virtual address table (VAT) is generated to store pointers to the objects stored in the non-volatile memory hosting the multiple XIP regions.

BRIEF DESCRIPTION OF THE DRAWINGS

The same reference numbers are used throughout the figures to reference like components and features.

DETAILED DESCRIPTION

This invention concerns an extensible XIP architecture suitable for use in an electronic appliance. In this regard, the invention is described in the general context of a computing system executing program modules to perform one or more tasks. Generally, program modules include routines, programs, objects, components, data structures, etc. that perform particular tasks or implement particular abstract data types. In this case, the program modules may well be included within the operating system or basic input/output system (BIOS) of an electronic appliance to walk the non-volatile memory and generate a virtual address table of available modules and their location, supporting multiple XIP regions. As used herein, the working definition of computing system is quite broad, as the teachings of the present invention may well be advantageously applied to a number of electronic appliances including, but not limited to, hand-held devices, communication devices, KIOSKs, personal digital assistants, multiprocessor systems, microprocessor-based or programmable consumer electronics, network PCs, minicomputers, mainframe computers, and the like. In a distributed computer environment, program modules may be located in both local and remote memory storage devices. It is noted, however, that modification to the architecture and methods described herein may well be made without deviating from the spirit and scope of the present invention.

Example Computing Environment

Figure 2:
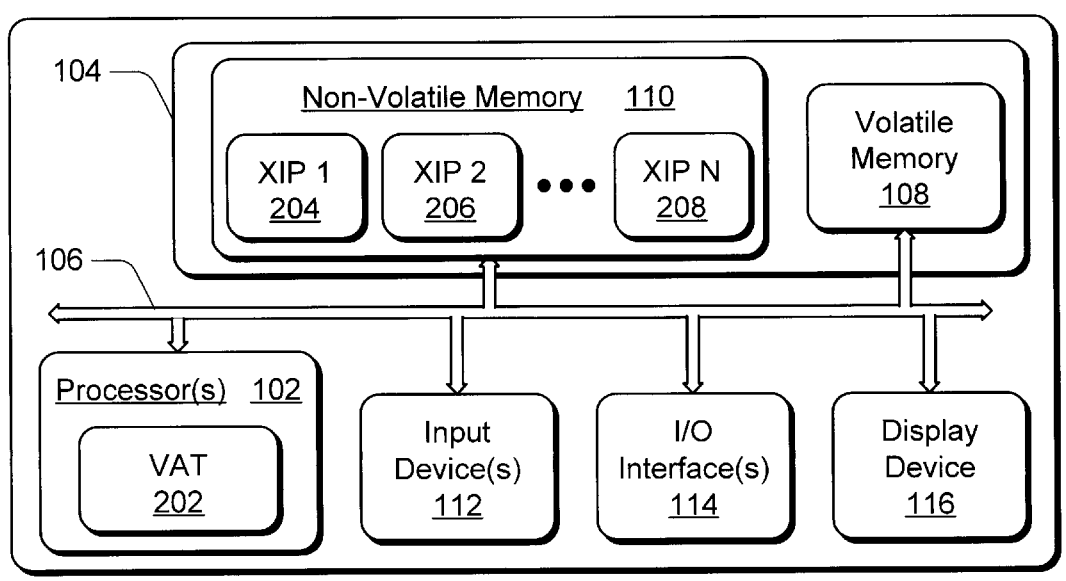
FIG. 2 is a block diagram of a computing system incorporating an innovative XIP architecture including a virtual address table (VAT) to facilitate multiple XIP regions, according to one embodiment of the present invention.

FIG. 2 illustrates an example of a suitable computing environment 200 on which the innovative XIP architecture may be implemented. As will be described more fully below, computing system 200 utilizes a virtual address table (VAT) 202, established by a kernel executing on the processor 102, to inventory objects (applications, data files, digital linked libraries (DLL's)) that the processor can access/execute-in-place (XIP) from within multiple XIP regions of non-volatile memory. It should be appreciated that computing environment 200 is only one example of a suitable computing environment and is not intended to suggest any limitation as to the scope of use or functionality of the extensible XIP architecture. Neither should the computing environment 200 be interpreted as having any dependency or requirement relating to any one or combination of components illustrated in the exemplary computing environment 200.

The exemplary XIP architecture is operational with numerous other general purpose or special purpose computing system environments or configurations. Examples of well known computing systems, environments, and/or configurations that may well benefit from the extensible XIP architecture described herein include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The features supporting the extensible XIP architecture, e.g., processor kernel, virtual address table, and the like may be described in the general context of computer-executable instructions, such as program modules, being executed by a computer. Generally, program modules include routines, programs, objects, components, data structures, etc. that perform particular tasks or implement particular abstract data types.

As shown in FIG. 2, the computing environment 200 includes a general-purpose computing device in the form of a computer. The components of computer 200 may include, but are not limited to, one or more processors or execution units 102 which generate a virtual address table 202, a system memory 104, and a bus 106 that couples various system components including the system memory 104 to the processor 102.

The virtual address table (VAT) 202 is generated by the processor kernel upon start-up or reset of the processor 102. As introduced above, the virtual address table 202 provides the processor with a single image of objects stored within ROM devices spanning a plurality of XIP regions 204–208. According to one implementation, the VAT 202 is implemented in the local address space (e.g., cache) of processor 102 and is comprised of a series of pointers denoting objects stored within the ROM devices of one or more XIP regions. Moreover, VAT 202 includes object dependency information (e.g., pointers), denoting object dependencies within and across XIP regions 202–208. By maintaining object dependencies, an object may be updated or replaced (i.e., by adding a ROM device(s) representing a new XIP region) to the computing system, while maintaining the dependency relationship to other established objects. For example, a manufacturer may release a new ROM containing an executable application. Upon integration with the computing system 200, the VAT 202 is modified by the processor kernel with a pointer to the new object, while maintaining pointers to objects which it is dependent upon, e.g., a DLL, data file, etc. In this regard, the VAT 202 facilitates a truly extensible XIP architecture.

Figure 1:
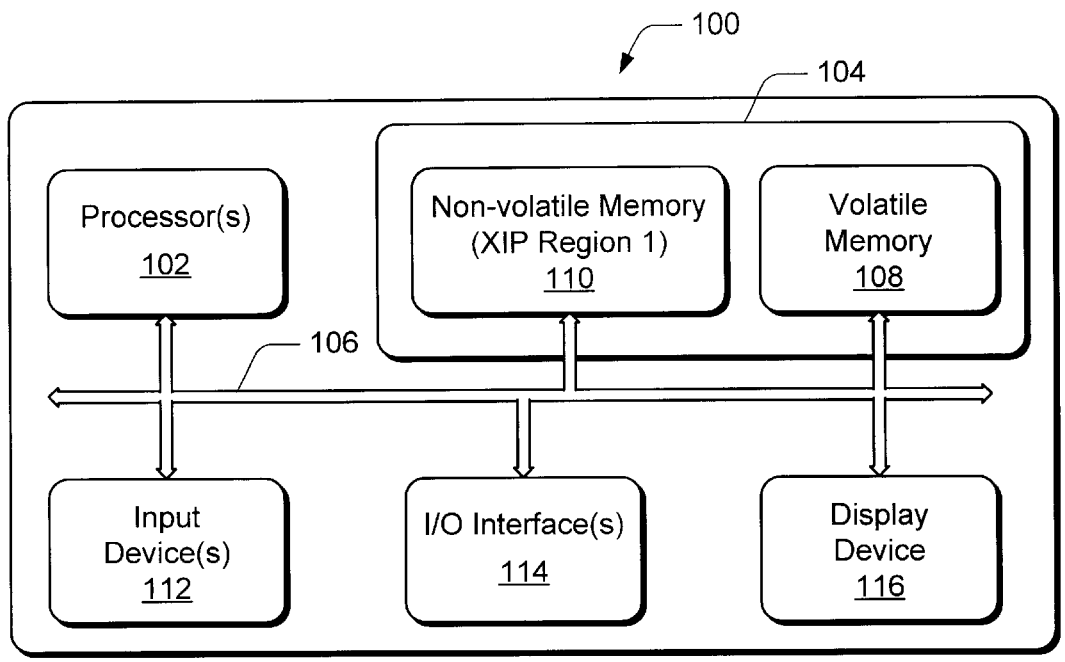
FIG. 1 is a block diagram of a computing system incorporating a typical prior art execute-in-place (XIP) architecture.

As shown, system memory 104 includes computer readable media in the form of volatile memory 108, such as random access memory (RAM), and/or non-volatile memory 110, such as read only memory (ROM). In accordance with one aspect of the present invention, computing appliance 200 supports multiple XIP regions 204–208 within the nonvolatile memory 110 of system memory 104. As introduced above, unlike the prior art XIP architectures exemplified by FIG. 1, processor 102 implements an innovative processor kernel which generates a virtual address table 202, and which maintains an inventory of pointers to objects stored within one or more ROM devices of one or more XIP regions.

While not depicted, computer 200 may further include other removable/non-removable, volatile/non-volatile computer storage media. By way of example only, a hard disk drive, a magnetic disk drive (e.g., a "floppy disk"), and/or an optical disk drive may also be implemented on computing system 200 without deviating from the scope of the invention. Moreover, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

Bus 106 is intended to represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

A user may enter commands and information into computer 200 through input devices 112 such as a keyboard and/or a pointing device (such as a "mouse") via an interface. Other input devices (not shown) may include a microphone, joystick, game pad, satellite dish, serial port, scanner, or the like, coupled to bus 106 via input/output (I/O) interface(s) 114.

Display device 116 is intended to represent any of a number of display devices known in the art. A monitor or other type of display device 116 is typically connected to bus 106 via an interface, such as a video adapter. In addition to the monitor, certain computer systems may well include other peripheral output devices (not shown), such as speakers and printers, which may be connected through output peripheral interface(s) 114.

Computer 200 may operate in a networked environment using logical connections to one or more remote computers via one or more I/O interface(s) 114 and/or network interface(s) (not shown). In this regard, computing devices of greater or lesser complexity may well benefit from the extensible XIP architecture, without deviating from the spirit and scope of the present invention.

Example Data Structure

Virtual Address Table

Figure 3:
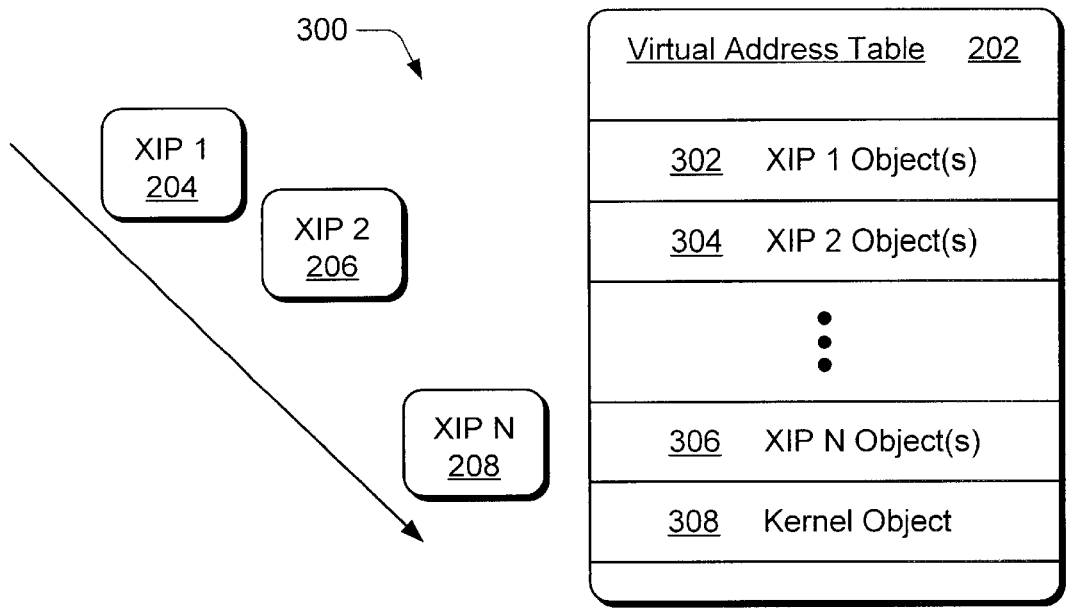
FIG. 3 is a graphical representation of a plurality of XIP regions mapped into a common, extensible XIP architecture, in accordance with the teachings of the present invention.

Turning to FIG. 3, a graphical illustration of the processor kernel walking the XIP region(s) to generate virtual address table 202 is presented, according to one embodiment of the present invention. As introduced above, virtual address table (VAT) 202 is created in local address space of the processor 102. As shown, the processor kernel walks the non-volatile memory (110) including one or more XIP regions 204–208 to create a virtual address table (VAT) of pointers to objects comprising the XIP region(s). As introduced above, according to one implementation, the VAT is created and maintained in a local memory of the processor 102. In alternate embodiments, processor 102 may generate and maintain the VAT in memory external to processor 102. According to one implementation, to be discussed more fully below, only pointers to the latest version of an object are maintained within the virtual address table 202. Pointers to obsolete objects, i.e., those objects replaced by later introduction of a new XIP region containing a newer version of the object, are replaced with a pointer to the newer version of the object. According to one implementation, the processor kernel walks the XIP regions 204–208 during an initialization period of the system. According to one aspect of the invention, the system 200 permits the live insertion of non-volatile memory containing additional XIP regions, whereupon a processor kernel walks the XIP regions to re-generate the VAT 202. In this way, live updates to XIP objects is facilitated. In either case, object dependencies are maintained within and across XIP regions 204–208, to facilitate incremental updates to XIP objects without losing XIP capability.

In accordance with one example implementation, VAT 202 is depicted comprising pointers 302–308 to one or more objects residing in one or more XIP regions 204–208 identified by the processor kernel. More specifically, the pointer is a pointer to an address in a non-volatile memory device which represents the start of an associated object. In addition, each VAT entry may also include additional pointers to other objects associated with the object of the VAT entry. In this regard, the processor kernel maintains a list of object relationships in VAT 202. It will be appreciated that maintaining a list of such object dependencies and relationships facilitates the piece-wise modification of individual objects while maintaining original object dependencies and relationships with objects in earlier XIP regions.

Example Operation and Implementation

Having introduced the functional and architectural elements of the extensible XIP architecture 200, an example operation and implementation is developed with reference to FIGS. 4 through 7. For ease of illustration, and not limitation, the discussion of the example operational and implementation details will be presented with continued reference to FIG. 2.

Figure 4:
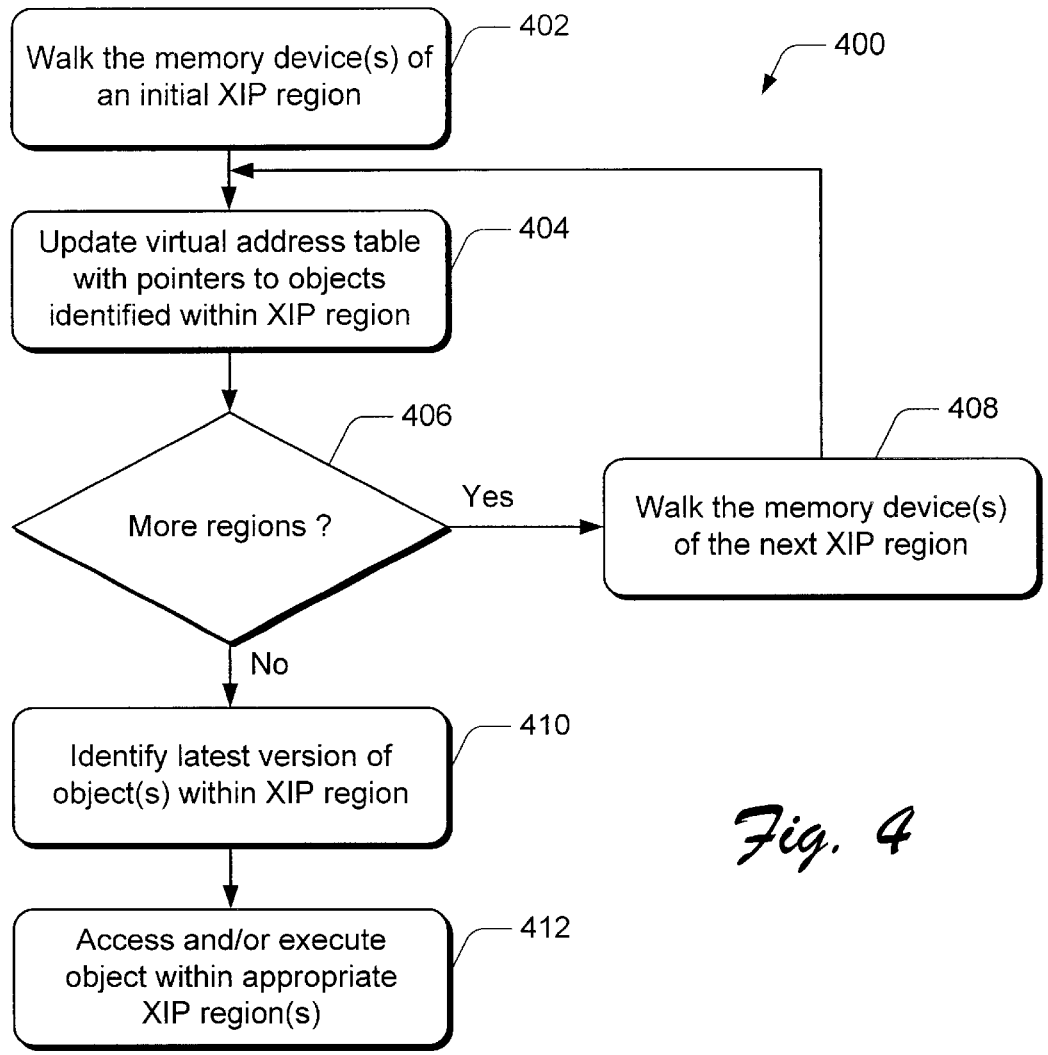
FIG. 4 is a flow chart of an example method for implementing an extensible XIP architecture, in accordance with one aspect of the present invention.

FIG. 4 illustrates an example method of implementing an extensible XIP architecture, according to one embodiment of the present invention. As shown, the method of FIG. 4 begins with block 402, wherein the processor 102, executing the processor kernel, "walks" the non-volatile memory device(s) 110 of an initial XIP region (e.g., 204) to catalog the objects of the XIP region. More specifically, processor 102 accesses a first address space within an initial non-volatile memory device of the XIP region to identify a table of contents (toc) for the memory device, noting the objects contained within the memory device. Each of the memory device(s) comprising an XIP region is similarly cataloged as the virtual address table 202 is dynamically created by the processor kernel, wherein the virtual address table 202 is updated with pointers to objects identified within the XIP region, block 404. An example of the processor kernel "walking" the ROM devices of a XIP region is graphically represented with reference to FIG. 5.

Figure 5:
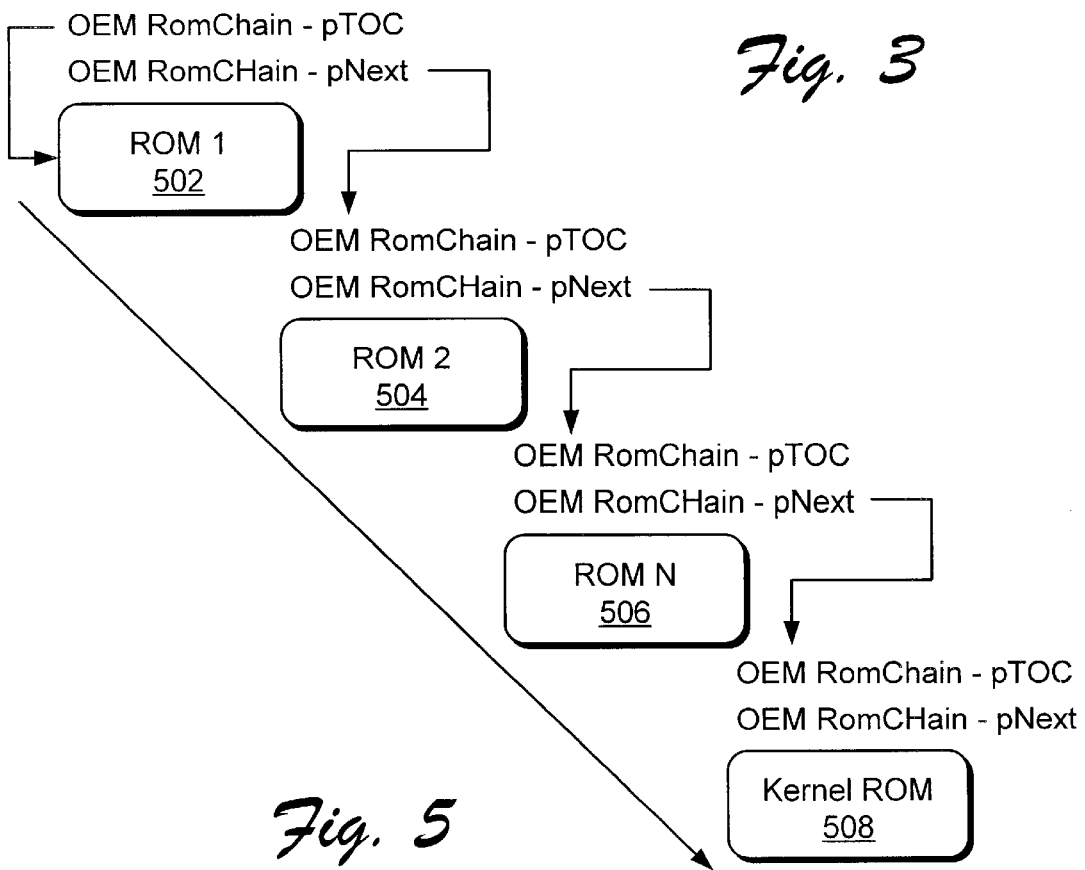
FIG. 5 is a graphical illustration of walking one or more non-volatile memory devices to catalog the objects within an XIP region, according to one embodiment of the invention.

Turning briefly to FIG. 5, a graphical representation of walking one or more non-volatile memory devices to catalog the objects within an XIP region is depicted, according to one aspect of the present invention. As introduced above, the processor kernel begins with an initial pointer to a table of contents (TOC) for the memory device 502. According to one implementation, the processor kernel utilizes the TOC to catalog the objects available within this memory device 502. More specifically, the processor kernel updates the VAT 202 with pointers to addresses within the memory device 502 for individual objects available within the memory device 502. In addition, the processor kernel identifies a pointer to the next memory device within the ROM chain comprising the XIP region, e.g., memory device 504, whereupon the processor kernel continues to build the VAT table with pointers to addresses of objects available within this next memory device. This process continues through the memory devices comprising one or more XIP regions until reaching the kernel memory device (e.g., 508). According to one example implementation, the kernel memory device 508 is always the last memory device to be cataloged within the VAT 202.

Figure 6:
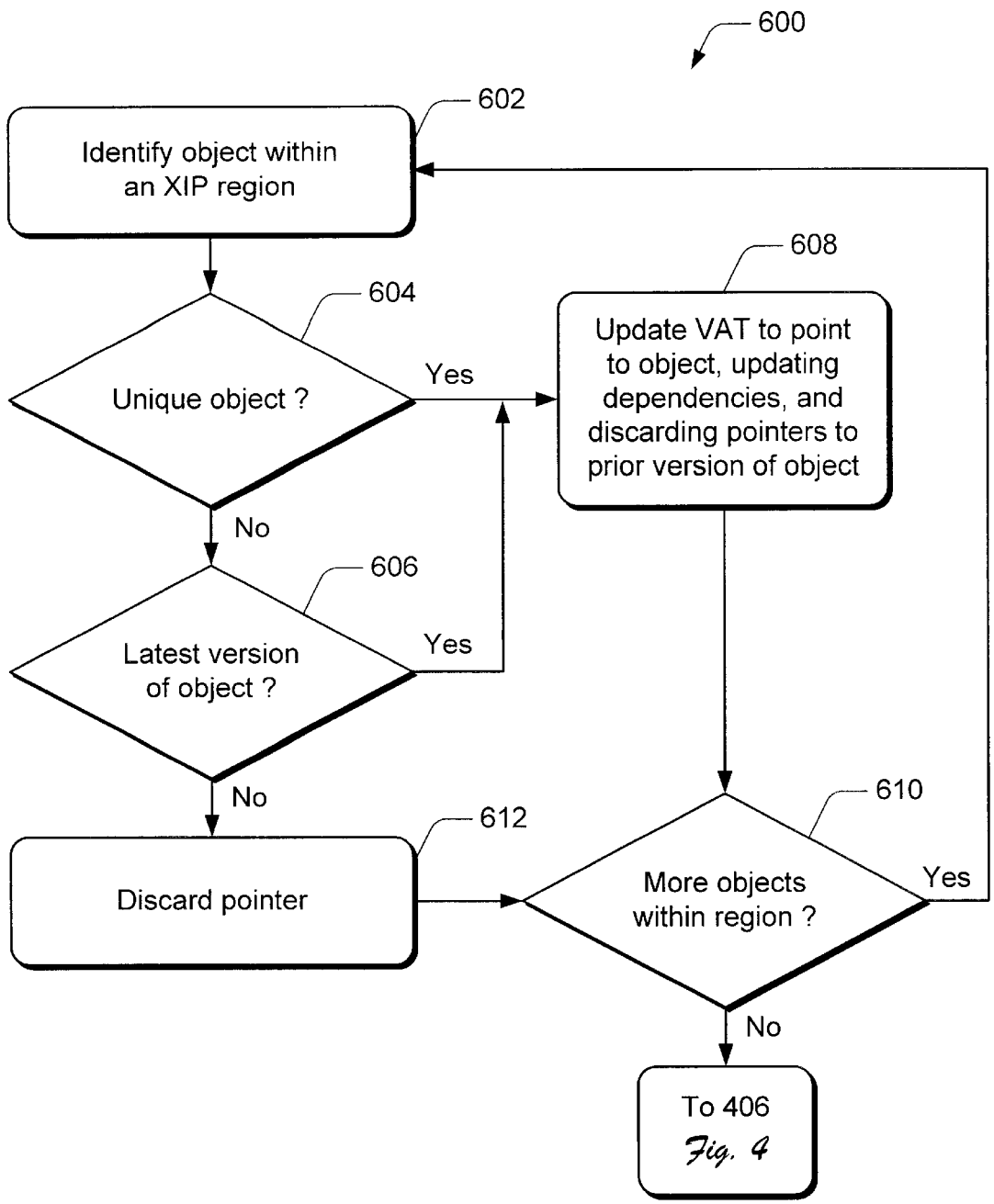
FIG. 6 is a flow chart of an example method for building the virtual address table (VAT) in support of the extensible XIP architecture, in accordance with one embodiment of the present invention.

Turning, briefly, to FIG. 6, an example method for updating the virtual address table 202 is presented in greater detail. As shown, the method begins with block 602, wherein the processor kernel identifies an object within a memory device (e.g., ROM) of a XIP region. In block 604, the processor kernel determines whether the object is unique. More particularly, the processor kernel determines whether the object is already identified within the virtual address table 202. If not, it is a unique object and the process continues with block 608, below.

If the object identified is not unique, i.e., virtual address table 202 already identifies another version of the object, the processor kernel determines if the newly identified object is the latest version of the object, block 606. According to one implementation, an object is considered to be a later version if it resides within a later XIP region. That is, an object residing in XIP region four (4) will be assumed to supersede a version of the object residing in XIP region two (2), but would be superseded by a version of the object residing in XIP region five (5). In an alternate implementation, the processor kernel may invoke a more subjective analysis of the content of the object itself to determine the relative versions of multiple occurrences of the object.

If it is the latest version of the object, processor kernel updates the virtual address table 202 to include a pointer to the identified object, block 608. In accordance with one aspect of the present invention, processor kernel also updates object dependencies to reflect the new object, and discards pointers to the prior version of the object. In this regard, a manufacturer can update objects on an individualized basis, i.e., without having to provide another copy of dependent objects that are already provided in other XIP regions.

The process continues with block 610, wherein the processor kernel determines whether more objects exist within the current XIP region. If so, the process returns to block 602, otherwise the process returns to block 406 of FIG. 4.

If, in block 606 the identified object does not represent the latest version of the object (i.e., the virtual address table already includes a later version of the object), a pointer to the object is discarded block 612, and the process continues with block 610, described above.

Returning to FIG. 4 and, more particularly block 406, the kernel determines whether additional XIP regions are available. If so, the kernel walks the memory device(s) 110 of the next XIP region, block 408, and the process continues with block 404.

If, in block 406, no additional XIP regions exist, the kernel completes the virtual address table 202 to identify only the latest version of object(s) within the XIP region(s), block 410. Once the VAT 202 is complete, processor 102 may access and/or execute objects within an appropriate one or more of the available XIP region(s), without first copying the objects to a volatile memory space, block 412.

Alternate Embodiments

Computer Readable Media

Certain elements for implementing an extensible XIP architecture 200 may be stored on or transmitted across some form of computer readable media in the form of computer executable instructions. According to one implementation, for example, instructions for implementing and utilizing the virtual address table 202 in support of the extensible XIP architecture may well be embodied in computer-executable instructions. As used herein, computer readable media can be any available media that can be accessed by a computer. By way of example, and not limitation, computer readable media may comprise "computer storage media" and "communications media."

As used herein, "computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Figure 7:
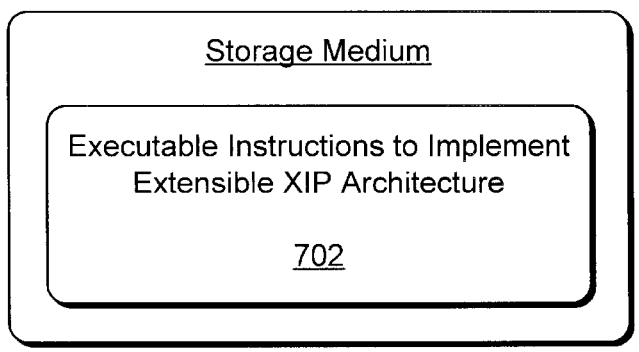
FIG. 7 is a graphical illustration of an example storage medium including instructions which, when executed, implement the teachings of the present invention, according to one embodiment of the present invention.

FIG. 7 is a block diagram of a storage medium 700 having stored thereon a plurality of instructions including instructions to implement an extensible XIP architecture 702, according to yet another embodiment of the present invention. More particularly, FIG. 7 illustrates a plurality of executable instructions which, when executed, enable a processor to generate a virtual address table (VAT) to store and maintain pointers to objects across multiple XIP regions.

As used herein, storage medium 700 is intended to represent any of a number of storage devices and/or storage media known to those skilled in the art such as, for example, volatile memory devices, non-volatile memory devices, magnetic storage media, optical storage media, and the like. Similarly, the executable instructions are intended to reflect any of a number of software languages known in the art such as, for example, C++, Visual Basic, Hypertext Markup Language (HTML), Java, eXtensible Markup Language (XML), and the like. Accordingly, the software implementation of FIG. 7 is to be regarded as illustrative, as alternate storage media and software embodiments are anticipated within the spirit and scope of the present invention.

Although the invention has been described in language specific to structural features and/or methodological steps, it is to be understood that the invention defined in the appended claims is not necessarily limited to the specific features or steps described. Rather, the specific features and steps are disclosed as exemplary forms of implementing the claimed invention.

What is claimed is:

1. An apparatus comprising:
   one or more non-volatile memory devices divided into one or more execute-in-place regions, each having stored therein one or more objects; and
   a processor, coupled to the one or more non-volatile memory devices, to generate a virtual address table (VAT) of pointers to object(s) stored in the non-volatile memory to execute the object(s) from the non-volatile memory without first copying the object(s) to another location.

2. An apparatus according to claim 1, wherein the processor generates the VAT by accessing each non-volatile memory device(s) comprising each of one or more XIP region(s) and storing a pointer to an address in the non-volatile memory associated with each identified object.

3. An apparatus according to claim 2, wherein the processor locates a table of contents (TOC) within each non-volatile memory device to identify objects stored therein.

4. An apparatus according to claim 2, wherein the each entry of the VAT contains a pointer to an address of an object stored within non-volatile memory.

5. An apparatus according to claim 4, wherein each entry of the VAT may contain additional pointer(s) to an address for other associated and/or dependent object(s).

6. An apparatus according to claim 1, wherein the processor updates VAT entries to denote a pointer to only a latest version of an object.

7. An apparatus according to claim 1, further comprising:
   a storage device, coupled to the processor, having stored therein a plurality of executable instructions;
   wherein the processor executes at least a subset of the plurality of executable instructions to implement an application to walk the non-volatile memory devices comprising the one or more XIP regions and generate the VAT.

8. An apparatus according to claim 7, wherein the application is a processor kernel.

9. An apparatus according to claim 1, wherein the VAT is generated and maintained within a local memory of the processor.

10. An apparatus according to claim 1, wherein the VAT is generated and maintained within an external memory coupled to the processor.

11. A system comprising:

a plurality of execute-in-place (XIP) regions of a non-volatile memory system; and a virtual address table (VAT), to store pointers to addresses of objects that are stored in the multiple XIP regions, and to facilitate execution in place of the objects.

12. A system according to claim 11, further comprising:

a storage medium having stored therein a plurality of executable instructions; and an execution unit, coupled to the storage medium, to execute at least a subset of the plurality of executable instructions to implement an application to walk one or more non-volatile memory devices comprising the non-volatile memory system, and to store pointers to addresses of objects resident within the non-volatile memory system in the VAT.

13. A system according to claim 12, wherein the application is a processor kernel.

14. A system according to claim 12, wherein the VAT is comprised of a plurality of entries, each entry containing at least a pointer to a start address of an object.

15. A system according to claim 14, wherein each entry may additionally comprise one or more pointers to an address associated with one or more associated and/or dependent objects.

16. A system according to claim 11, wherein the VAT is maintained within a local memory of a processor of the system.

17. A method comprising:

walking one or more non-volatile memory devices comprising a first execute-in-place (XIP) region; and generating a virtual address table (VAT) to store pointers to one or more objects identified in the non-volatile memory devices of the XIP region.

18. A method according to claim 17, further comprising:

walking one or more non-volatile memory devices of a subsequent XIP region; and updating the VAT to store pointers to one or more objects identified in the subsequent XIP region.

19. A method according to claim 18, further comprising:

identifying common objects in two or more XIP regions; and eliminating pointers to all but an object appearing in a later XIP region when common objects are identified.

20. A method according to claim 17, wherein walking the one or more non-volatile memory comprises:

identifying a first non-volatile memory device of the XIP region;

locating a table of contents (TOC) for the first non-volatile memory device; and generating a VAT entry for each object identified within the TOC to store a pointer to an address representing the start of the object.

21. A method according to claim 20, further comprising:

storing a pointer to identified objects within the generated VAT entries.

22. A method according to claim 21, further comprising:

searching for a pointer to a subsequent non-volatile memory device of the XIP region, if any; and repeating the locating, generating, and storing steps if the pointer to the subsequent non-volatile memory device is found.

23. A method according to claim 22, further comprising:

iteratively performing the searching, locating, generating and storing steps for each non-volatile memory device for each of a plurality of XIP regions.

24. A method according to claim 20, further comprising:

determining whether each object identified within the first non-volatile memory device is a first occurrence of the object; and storing a pointer to each object within an associated VAT entry if the object is the first occurrence of the object.

25. A method according to claim 24, further comprising:

identifying a VAT entry associated with an earlier occurrence of the object if the object is not the first occurrence; and updating the VAT entry associated with the earlier occurrence of the object with a pointer to an address associated with the subsequent object.

26. A method according to claim 24, further comprising:

storing a pointer to each object associated with an object of the VAT entry in the VAT entry, wherein each VAT entry contains a pointer to an object and, optionally, one or more pointers to objects associated with and/or dependent on the object.

27. A storage medium comprising a plurality of executable instructions which, when executed, implement a method according to claim 17.

28. A computing system comprising:

a storage medium having stored therein a plurality of executable instructions; and an execution unit, coupled to the storage medium, to execute at least a subset of the plurality of executable instructions to implement a method according to claim 17.

29. A storage medium comprising a plurality of executable instructions which, when executed, implement an application to generate a virtual address table (VAT) of pointers to objects located within non-volatile memory of a plurality of execute-in-place (XIP) regions of the non-volatile memory to facilitate execution of and/or access to such objects.

30. A storage medium according to claim 29, wherein the application is a processor kernel, implemented by a processor of a computing system.

31. A storage medium according to claim 29, wherein each VAT entry contains a pointer to a primary object, as well as pointers to one or more associated and/or dependent objects.

* * * * *

UNITED STATES PATENT AND TRADEMARK OFFICE
CERTIFICATE OF CORRECTION

PATENT NO. : 6,574,747 B2
DATED : June 3, 2003
INVENTOR(S) : Ginsberg

It is certified that error appears in the above-identified patent and that said Letters Patent is hereby corrected as shown below:

Column 10,
Line 48, replace "to implement a method according to claim 17." with
-- to:
   walk one or more non-volatile memory devices comprising a first execute-in-place (XIP) region; and
    generate a virtual address table (VAT) to store pointers to one or more objects identified in the non-volatile memory devices of the XIP region. --.

Signed and Sealed this

Fourth Day of November, 2003

JAMES E. ROGAN
*Director of the United States Patent and Trademark Office*